US012784953B2

(12) United States Patent
Chen et al.

(10) Patent No.: US 12,784,953 B2
(45) Date of Patent: Nov. 3, 2026

(54) Y-TYPE HEXAFERRITE, METHOD OF MANUFACTURE, AND USES THEREOF

(71) Applicant: ROGERS CORPORATION, Chandler, AZ (US)

(72) Inventors: Yajie Chen, Andover, MA (US); Lance Young, Shrewsbury, MA (US)

(73) Assignee: ROGERS CORPORATION, Chandler, AZ (US)

( * ) Notice: Subject to any disclaimer, the term of this patent is extended or adjusted under 35 U.S.C. 154(b) by 447 days.

(21) Appl. No.: 18/509,451

(22) Filed: Nov. 15, 2023

(65) Prior Publication Data

US 2024/0203624 A1 Jun. 20, 2024

Related U.S. Application Data

(60) Provisional application No. 63/428,266, filed on Nov. 28, 2022.

(51) Int. Cl.
*H01F 1/34* (2006.01)
*C01G 51/66* (2025.01)
(Continued)

(52) U.S. Cl.
CPC ............. *H01F 1/348* (2013.01); *C01G 51/66* (2013.01); *C01G 53/66* (2013.01); *C08K 3/22* (2013.01);
(Continued)

(58) Field of Classification Search
CPC ... H01F 1/34; H01F 1/348; H01F 1/36; H01F 1/37; H01F 3/08; H01F 41/0246; C04B 35/26; C04B 35/2608; C04B 35/2633; C04B 35/268; C04B 35/2666; C04B 35/6261; C04B 35/62675;
(Continued)

(56) References Cited

U.S. PATENT DOCUMENTS 3,020,426 A 2/1962 Burgt
3,461,072 A 8/1969 Winkler
(Continued)

FOREIGN PATENT DOCUMENTS

CN 102076629 A 5/2011
CN 102408202 A 4/2012
(Continued)

OTHER PUBLICATIONS

Shigemura, Synthesis of non-magnetic-ion substituted Ca-based M-type ferrite, Journal of the Magnetics Society of Japan, 2017, vol. 41, Issue 5, pp. 94-98, Released on J-STAGE Sep. 1, 2017 (Year: 2017).
(Continued)

*Primary Examiner* — Matthew E. Hoban
*Assistant Examiner* — Lynne Edmondson
(74) *Attorney, Agent, or Firm* — CANTOR COLBURN LLP

(57) ABSTRACT

A NiHf- or NiTi-doped $Co_2$Y-type ferrite, having a formula of $$Ba_{n-x}Sr_xCo_{2-y}Cu_yNi_zHf_zFe_{(m-2z)}O_{22} \text{ or } Ba_{n-x}Sr_xCo_{2-y}Cu_yTi_zHf_zFe_{(m-2z)}O_{22}$$

wherein 2≤n≤2.4, 0≤x≤1, 0.1≤y≤1, 0<z≤2, and 10≤m≤13.

14 Claims, 2 Drawing Sheets

(51) Int. Cl.
*C01G 53/66* (2025.01)
*C04B 35/26* (2006.01)
*C08K 3/22* (2006.01)
*H01F 1/36* (2006.01)
*H01F 1/37* (2006.01)
*H01Q 1/36* (2006.01)

(52) U.S. Cl.
CPC ......... *H01Q 1/364* (2013.01); *C01P 2002/52* (2013.01); *C01P 2006/40* (2013.01); *C01P 2006/42* (2013.01); *C08K 2003/2289* (2013.01); *C08K 2003/2293* (2013.01); *C08K 2201/01* (2013.01)

(58) Field of Classification Search
CPC .... C04B 2235/3215; C04B 2235/3232; C04B 2235/3244; C04B 2235/3272; C04B 2235/3275; C04B 2235/3279; C04B 2235/3281; C04B 2235/604; C04B 2235/77; C04B 2235/96
See application file for complete search history.

(56) References Cited

U.S. PATENT DOCUMENTS

| | | | |
|---|---|---|---|
| 4,664,831 A | 5/1987 | Hibst et al. | |
| 4,911,957 A | 3/1990 | Oishi et al. | |
| 4,957,812 A | 9/1990 | Aoki et al. | |
| 5,515,059 A * | 5/1996 | How | H01Q 3/44 342/372 |
| 5,593,612 A * | 1/1997 | Lubitz | C01G 51/82 252/62.59 |
| 6,071,430 A | 6/2000 | Lebourgeois et al. | |
| 6,358,432 B1 | 3/2002 | Tomono et al. | |
| 6,373,425 B1 * | 4/2002 | Inoue | H01Q 17/007 342/4 |
| 6,436,307 B1 | 8/2002 | Lebourgeois et al. | |
| 6,736,990 B2 | 5/2004 | Aoki et al. | |
| 8,263,224 B2 | 9/2012 | Tokiwa | |
| 10,468,169 B2 | 11/2019 | Chen et al. | |
| 10,766,786 B2 | 9/2020 | Chen et al. | |
| 2002/0039667 A1 | 4/2002 | Takaya et al. | |
| 2002/0050309 A1 | 5/2002 | Marusawa | |
| 2003/0052298 A1 | 3/2003 | Wang et al. | |
| 2003/0091841 A1 | 5/2003 | Marusawa | |
| 2004/0069969 A1 | 4/2004 | Endo et al. | |
| 2005/0123743 A1 | 6/2005 | Martinazzo | |
| 2007/0231614 A1 | 10/2007 | Kondo et al. | |
| 2008/0149882 A1 | 6/2008 | Terazono et al. | |
| 2009/0057606 A1 | 3/2009 | Tada et al. | |
| 2009/0297432 A1 | 12/2009 | Hill | |
| 2012/0229354 A1 | 9/2012 | Ishikura et al. | |
| 2013/0115160 A1 | 5/2013 | Hill et al. | |
| 2013/0292602 A1 | 11/2013 | Hill | |
| 2014/0291571 A1 | 10/2014 | Hirose | |
| 2014/0346387 A1 | 11/2014 | Hill et al. | |
| 2016/0086728 A1 | 3/2016 | Suetsuna et al. | |
| 2016/0113113 A1 | 4/2016 | Sethumadhavan et al. | |
| 2016/0118171 A1 | 4/2016 | Hill | |
| 2016/0276072 A1 | 9/2016 | Sethumadhavan et al. | |
| 2017/0213628 A1 | 7/2017 | Chen et al. | |
| 2017/0222331 A1 | 8/2017 | Pance et al. | |
| 2018/0016157 A1 | 1/2018 | Chen et al. | |
| 2019/0013128 A1 | 1/2019 | Chen et al. | |
| 2019/0221343 A1 | 7/2019 | Chen et al. | |
| 2019/0264005 A1 | 8/2019 | Horn et al. | |
| 2019/0318858 A1 | 10/2019 | Chen et al. | |
| 2021/0020343 A1 | 1/2021 | Chen et al. | |
| 2021/0032121 A1 | 2/2021 | Li et al. | |
| 2021/0043346 A1 | 2/2021 | Li et al. | |
| 2021/0065943 A1 | 3/2021 | Zhang et al. | |
| 2021/0179442 A1 | 6/2021 | Chen et al. | |
| 2021/0225566 A1 | 7/2021 | Zhang et al. | |
| 2021/0246046 A1 | 8/2021 | Chen et al. | |
| 2021/0261433 A1 | 8/2021 | Chen et al. | |
| 2022/0367093 A1 | 11/2022 | Chen et al. | |
| 2022/0367094 A1 | 11/2022 | Chen et al. | |
| 2023/0352221 A1 | 11/2023 | Chen et al. | |
| 2023/0352222 A1 | 11/2023 | Chen et al. | |
| 2023/0352223 A1 | 11/2023 | Chen et al. | |
| 2023/0399237 A1 | 12/2023 | Chen et al. | |
| 2024/0158302 A1 | 5/2024 | Chen et al. | |

FOREIGN PATENT DOCUMENTS

| | | | |
|---|---|---|---|
| CN | 103304186 | A | 9/2013 |
| CN | 103613373 | A | 3/2014 |
| CN | 101636449 | B | 10/2014 |
| CN | 104193224 | A | 12/2014 |
| DE | 3907220 | | 9/1990 |
| EP | 1652829 | A2 | 5/2006 |
| EP | 2784044 | A1 | 10/2014 |
| EP | 3012843 | A1 | 4/2016 |
| GB | 1105788 | A | 3/1968 |
| GB | 2599251 | A | 3/2022 |
| JP | S6245005 | A | 2/1987 |
| JP | 62216922 | A | 9/1987 |
| JP | S36365085 | A | 3/1988 |
| JP | 6489504 | A | 4/1989 |
| JP | H01200605 | A | 8/1989 |
| JP | H02120237 | A | 5/1990 |
| JP | H0615411 | B2 | 3/1994 |
| JP | H09167703 | | 6/1997 |
| JP | H09232123 | A | 9/1997 |
| JP | 2000235916 | A | 8/2000 |
| JP | 2001085210 | A | 3/2001 |
| JP | 2008169378 | A | 7/2008 |
| JP | 2010109056 | A | 5/2010 |
| JP | 2015191935 | A | 11/2015 |
| WO | 9600454 | A1 | 1/1996 |
| WO | 2011081399 | A2 | 7/2011 |
| WO | 2012103020 | A2 | 8/2012 |
| WO | 2016064459 | | 4/2016 |
| WO | 2016123598 | A1 | 8/2016 |
| WO | 2017068444 | | 4/2017 |
| WO | 2017127388 | A1 | 7/2017 |
| WO | 2020162295 | A1 | 8/2020 |
| WO | 2021061599 | A1 | 4/2021 |
| WO | 2021162886 | A1 | 8/2021 |

OTHER PUBLICATIONS

Aoyama et al.; "Preparation and Characterization of Z-type Hexaferrites, Ba3(1-x)Sr3xCo2Fe24O41 with x=0-0.5, via a two-step calcination with an intermediate wet milling"; J. Electroceram; 17; pp. 61-64 (2006).
Bid et al.; "Microstructure Characterization of Mechanosynthesized Nanocrystalling NiFe2O4 by Rietveld's Analysis"; Physica E 39; pp. 175-184; (2007).
Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.
Brando et al., "Microwave Electromagnetic Characteristics of New Substituted M-Hexaferrites BaFe12—2xAxMexO19 (A=Ru, Ir ; Me=Co, Zn)", Journal De Physique IV France, Mar. 1997.
Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.
Cao et al. "Hydrogen-Induced Lateral Growth of Nickel Coating on Ba3Co2Fe24O41•Co2Z-Based Hexaferrite during the Electroplating of Multilayer Chip Inductors," Journal of The Electrochemical Society, 2002, vol. 149 Issue 12, pp. J89-J92.
Faouri et. al., "High quality factor cold sintered Li2MoO4—BaFe12019 composites for microwave applications, " Mar. 2019, Acta Materialia, vol. 166, pp. 202-207.
Haijun et al., "The preparation and microwave properties of Ba3ZnzCo2—zFe24O41 ferrite by citrate sol-gel process", Materials Science and Engineering, B84, 2001, pp. 252-257.

(56) References Cited

OTHER PUBLICATIONS

Ismail et al.; "Magnetic Properties of Mechanically Alloyed Cobalt-Zinc Ferrite Nanoparticles"; J. Supercond Nov Magn; 27; pp. 1293-1298; (2014).

Kim et al., "Effects of in3+ site occupancy on the magnetic properties of M-type strontium hexaferrites", AIB Advances 10, 015040 (2020); https://doi.org/10.1063/1.5130073; 5 pages.

Kim, H., et al. "Epitaxial growth of Zn2Y ferrite films by pulsed laser deposition," Journal of Vacuum Science, American Institute of Physics, 2 Huntington Quadrangle, Melville, NY 11747; vol. 17; No. 5; Sep. 1999; pp. 3111-3114.

Kohn, J.A. and Eckart, D.W. "Cell, Symmetry and Basic Structure of A New Ferrimagnet," Mat. Res. Bull., vol. 6, pp. 743-748, 1971.

Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.

Kristiantoro et al. , "Magnetic properties of cobalt ferrite synthesized by mechanical alloying", from AIP Conf 1964, 020003 (2018) Published Online May 15, 2018; 5 pages.

Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.

Lee et al., "Low Loss Co2Z (Ba3Co2Fe24O41)-Glass Composite for Gigahertz Antenna Application," Journal of Applies Physics, 2011, vol. 109, 07E530-2.

Li et al. "High-frequency magnetic properties of W-type barium-ferrite BaZn2—xCoxFe16027 composites", Journal of Applied Physics 94, 5918 (2003): https://doi.org/10.1063/1.1618945.

Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.

Li et al; "Static and Dynamic Magnetic Properties of Co2Z Barium Ferrite Nanoparticle Composites"; Journal of Materials Science, 40, pp. 719-723 (2005).

Li, Jie, et al. "Structural and magnetic properties of M—Ti (M=Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.

Li, Qifan, et al. "Emerging magnetodielectric materials for 5G communications: 18H hexaferrites," Acta Materialia 231 (2022) 117854 Elsevier Ltd., 10 pages.

Lui, Chaocheng, et al. "Characterizations of magnetic transition behavior and electromagnetic properties of Co—Ti co-substituted SrM-based hexaferrites SrCoxTixFe12—2xO19 compounds," Journal of Alloys and Compounds, vol. 784, Jan. 11, 2019, pp. 1175-1186.

Mahmood, Sami H., et al. "Modification of the Magnetic Properties of Co<sub>2</sub>Y Hexaferrites by Divalent and Trivalent Metal Substitutions," Solid State Phenomena, vol. 241; Oct. 2015, pp. 93-125.

Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.

Morch et al. "Structure and Magnetic properties of W-type hexaferrites," 2019, IUCRJ, pp. 492-499, vol. 6.

Mu et al., "Improvement of high-frequency characteristics of Z-type hexaferrite by dysprosium doping", Journal of Applied Physics, 109, 123925, 2011, 6 pages.

Narayanasamy et al., "Influence of Mechanical Milling and Thermal Annealing on Electrical And Magnetic Properties of Nanstructured Ni—Zn and Coblat Ferrites," June 2208, Bull Mater Sci., vol. 31 No. 3, pp. 373-380.

Obol et al.; "Oriented Y-type Hexaferrites for Ferrite Device"; J. Appl. Phys.; 91(10); pp. 7616-7618; (2002).

Pullar et al; "Hexagonal Ferrites: A Review of the Synthesis, Properties and Applications of Hexaferrite Ceramica"; Progress in Materials Science; 57; pp. 1191-1134; (2012).

Pullar, "Hexagonal Ferrite Fibres and Nanofibres," Trans Tech Publications, 2016, pp. 1-68, vol. 241.

Pullar, "Magnetic Properties of Aligned Co2Z Hexagonal Z-Ferrite Fibers," International Journal of Applied Ceramic Technology, 2014, pp. 451-456, vol. 11, No. 3.

Sahoo et al. Enhanced Magnetoelectricity in Bismuth Substituted SrFe12O19 Hexaferrite, Aug. 2019, Journal of Applied Physics, vol. 126, No. 7.

Savage, R. O. et al., "Magnetic Properties of Single Crystal CuNi—18H and MgZn—18H Solid Solutions", AIP Conference Proceedings (1975). vol. 24, pp. 491-492, doi.org/10.1063/1.29974.

Singh et al. "Static Magnetic Properties of Co and Ru substituted Ba—Sr ferrite," 2008, Materials Research Bulletin, pp. 176-184, vol. 43.

Su et el., "Low Loss Factor Co2Z Ferrite Composites with Equivalent Permittivity and Permeability for Ultra-high Frequency Applications," Applied Physics Letters, Aug. 2014, vol. 105 No. 062402.

Tauber, A. et al., "Magnetic Properties of a Unique 18-Layer Hexagonal Ferrite", Journal of Applied Physics 42, 1738 (1971); https://doi.org/10.1063/1.1660419; Published Online: Dec. 19, 2003; 4 pages; https://doi.org/10.1063/1.1660419.

Tauber, A. et al., "Magnetic Properties of Single Crystal Ba5Me2Ti3Fe12O31, ME=Co, Cu", AIP Conference Proceedings (1972) 5(1):1547-1551 ; https://doi.org/10.1063/1.2953911.

Waje et al.; "Sintering Temperature dependence of Room Temperature Magnetic and Dielectric Properties of Co0.5Zn0.5F32O4 Prepared using Mechanically Alloyed Nanoparticles"; Journal of magnetism and Magnetic Materials; 322; pp. 686-691; (2010).

Watanabe Kazuya et al., "Discovery of the New Crystallographic Phase Of an Exotic Magnetic Oxide: 118H-type Hexaferrite," Journal of the physical society of Japan, Jan. 15, 2020, vol. 89, No. 1, p. 014704.

Carvalheiras et al. "Synthesis of red mud derived M-type barium hexaferrites with tuneable coercivity", Ceramics International, vol. 46, No. 5, 2019-11-07, pp. 5757-5764, XP086001988.

Deng, et al; Effect of Bi and Mo Doping on Magnetic and Sintered Characteristics of MgCuZn Ferrite, Journal of Inorganic Materials, 2008, pp. 670-672, vol. 23 No. 4.

Guo, Li, et al. "Low temperature co-fired Co2Z barium-strontium ferrite materials with BBSC glass" J Mater Sci: Mater Electron, vol. 27, pp. 2841-2845, Nov. 26, 2015.

International Search Report and Written Opinion for International Application No. PCT/US2023/079734, International Filing Date Nov. 15, 2023, Date of Mailing Mar. 11, 2024, 8 pages.

Pasko et al. "Magnetic and Structural characterization of nanosized BaCoxZn2—xFe16027 hexaferrite in the vicinity of spin reorientation transition," 2011, Journal of Physics: Conference Series 303.

Wang, Yu, et al. "Study on Microwave Performance of Low-Temperature Sintered, Ba(CoTi)1.5Fe9O19 Ferrite for Application at UHF Frequency" J Supercon Nov Magn, vol. 31, pp. 455-461, Jul. 6, 2017.

You, Jae-Hyoung, et al. Magnetic Properties of Zn-substituted Y-type hexaferrites, Ba2ZnxFe2—xFe12O22, Journal of Magnetism and Magnetic Materials, 471 (2019) 255-261.

* cited by examiner

Y-TYPE HEXAFERRITE, METHOD OF MANUFACTURE, AND USES THEREOF

CROSS REFERENCE TO RELATED APPLICATION

This application claims the benefit of U.S. Provisional Application Ser. No. 63/428,266, filed Nov. 28, 2022, which is incorporated herein by reference in its entirety.

BACKGROUND

The disclosure is directed to a Y-type hexaferrite including nickel and hafnium or titanium.

Improved performance and miniaturization are desired to meet the ever-increasing demands of devices used in very high frequency applications, which are of interest, for example, in a variety of commercial and defense related industries. As an important component in radar and Global Positioning System (GPS) navigation systems, antenna elements with compact sizes are constantly being developed. It has been challenging however to develop ferrite materials for use in such high frequency applications as ferrite materials can exhibit relatively high magnetic loss at high frequencies.

Hexagonal ferrites, or hexaferrites, a type of iron-oxide ceramic compound that has a hexagonal crystal structure, can exhibit magnetic properties. Families of hexaferrites include Z-type ferrites, $Ba_3Me_2Fe_{24}O_{41}$, and Y-type ferrites, $Ba_2Me_2Fe_{12}O_{22}$, wherein Me can be a small 2+ cation such as Co or Zn, and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Hexaferrites with a high magnetocrystalline anisotropy field are good candidates for gigahertz antenna substrates because hexaferrites have a high magnetocrystalline anisotropy field and thereby a high ferromagnetic resonance frequency. Improved ferrites with low loss values at about one gigahertz (GHz) are desirable.

BRIEF SUMMARY

Disclosed herein is a NiHf- or NiTi-doped $Co_2Y$-type ferrite.

In an aspect, a NiHf- or NiTi-doped $Co_2Y$-type ferrite having a formula of $$Ba_{n-x}Sr_xCo_{2-y}Cu_yNi_zHf_zFe_{(m-2z)}O_{22} \text{ or } Ba_{n-x}Sr_xCo_{2-y}Cu_yNi_zTi_zFe_{(m-2z)}O_{22}$$

wherein $2 \le n \le 2.4$, $0 \le x \le 1$, $0.1 \le y \le 1$, $0 < z \le 2$, and $10 \le m \le 13$.

In an aspect, a composite includes a polymer and the NiHf- or NiTi-doped $Co_2Y$-type ferrite.

In an aspect, an article includes the NiHf- or NiTi-doped $Co_2Y$-type ferrite.

In an aspect, a method of making a NiHf- or NiTi-doped $Co_2Y$-type ferrite includes milling ferrite precursor compounds including oxides of Ba, Co, Cu, Ni, Fe, and either Hf or Ti to form a magnetic oxide mixture; and calcining the magnetic oxide mixture in an oxygen or air atmosphere to form the NiHf- or NiTi-doped $Co_2Y$-type ferrite.

The above described and other features are exemplified by the following detailed description and claims.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
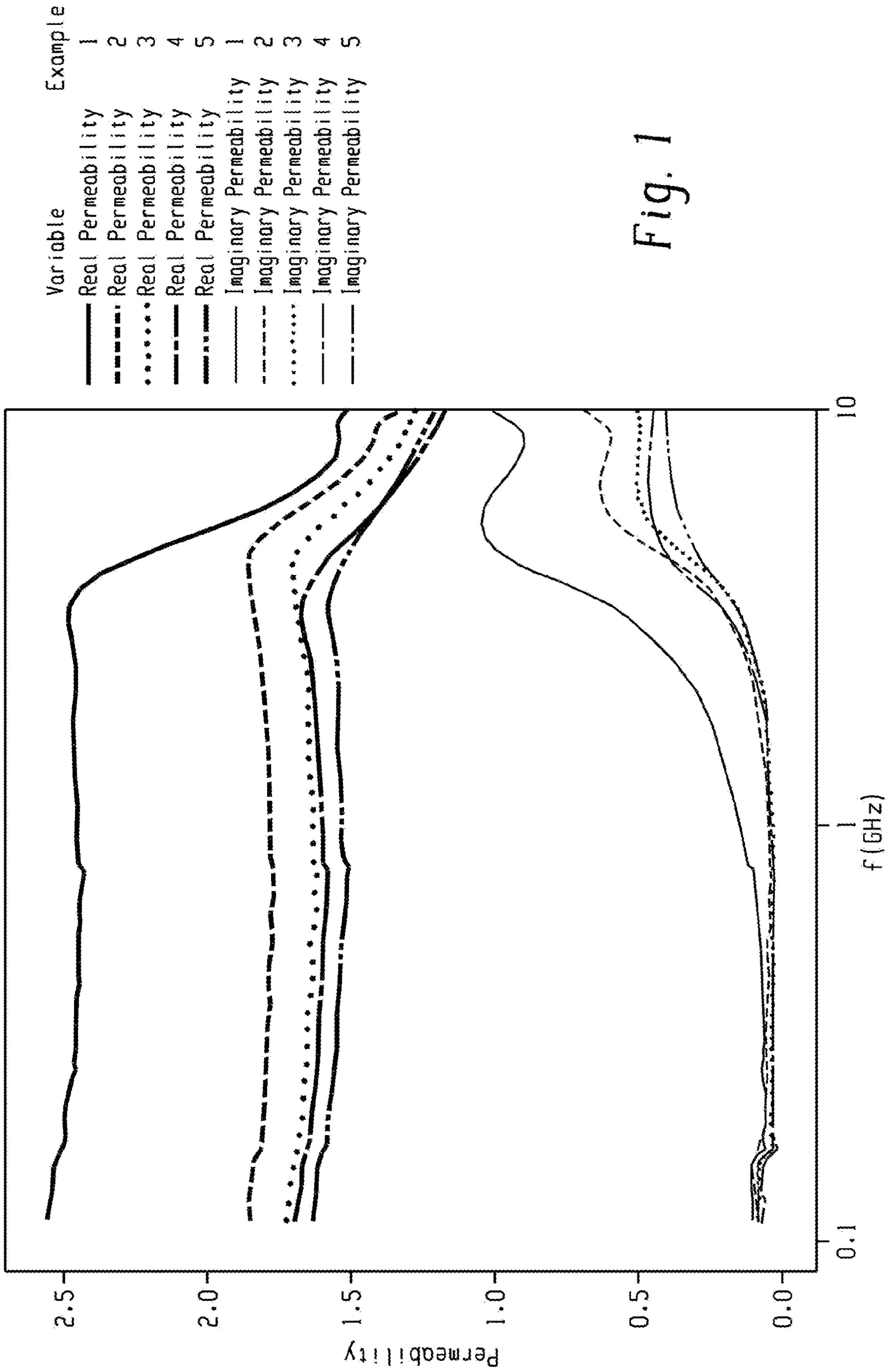
FIG. 1 is a graph of real permeability μ' and imaginary permeability μ" versus frequency (f) (GHz) showing magnetic spectra of the NiHf-doped $Co_2Y$-type ferrite ceramics of Examples 1 to 5.

It was discovered that a NiHf-doped $Co_2Y$-type ferrite including both nickel and hafnium or a NiTi-doped $Co_2Y$-type ferrite including both nickel and titanium (collectively referred to herein as a "NiHf- or NiTi-doped $Co_2Y$-type ferrite") displays a very low loss at a frequency of 0.5 to 3 GHz that is difficult to achieve with Y-type ferrites. For example, it was found that a NiHf- or NiTi-doped $Co_2Y$-type ferrite can have a magnetic loss tangent of less than or equal to 0.08, for example, 0.02 to 0.08, at a frequency of 0.5 to 3 GHz. The NiHf- or NiTi-doped $Co_2Y$-typeferrite includes Ba, Co, Cu, Ni, Fe, O, and either Hf or Ti. The NiHf- or NiTi-doped $Co_2Y$-type ferrite can have the formula (1)

$$Ba_{n-x}Sr_xCo_{2-y}Cu_yNi_zHf_zFe_{(m-2z)}O_{22} \quad (1)$$

or the formula (2)

$$Ba_{n-x}Sr_xCo_{2-y}Cu_yNi_zTi_zFe_{(m-2z)}O_{22} \quad (2)$$

wherein $2 \le n \le 2.4$, $0 \le x \le 1$, $0.1 \le y \le 1$, $0 < z \le 2$, and $10 \le m \le 13$. In an aspect, x=0, and $0.1 \le z \le 2$. In an aspect, n=2.1, y=0.4 $0.2 \le z \le 0.8$, and m=11.7. Accordingly, the NiHf- or NiTi-doped $Co_2Y$-type ferrite can be stoichiometric or non-stoichiometric, e.g., in an aspect m is 12 and in an aspect m is not equal to 12. The NiTi-doped $Co_2Y$-type ferrite can have a formula of $Ba_{2.1}Co_{1.6}Cu_{0.4}Ni_{0.2}Ti_{0.2}Fe_{11.3}O_{22}$, $Ba_{2.1}Co_{1.6}Cu_{0.4}Ni_{0.4}Ti_{0.4}Fe_{10.9}O_{22}$, $Ba_{2.1}Co_{1.6}Cu_{0.4}Ni_{0.6}Ti_{0.6}Fe_{10.5}O_{22}$, or $Ba_{2.1}Co_{1.6}Cu_{0.4}Ni_{0.8}Ti_{0.8}Fe_{10.1}O_{22}$.

In an aspect, the NiHf-doped $Co_2Y$-type ferrite has the formula (2)

$$Ba_{n-x}Sr_xCo_{2-y}Cu_yNi_zHf_zFe_{(m-2z)}O_{22} \quad (2)$$

wherein $2 \le n \le 2.4$, $0 \le x \le 1$, $0.1 \le y \le 1$, $0 < z \le 2$, and $10 \le m \le 13$. In an aspect, x=0, and $0.1 \le z \le 2$. In an aspect, n=2.1, y=0.4 $0.2 \le z \le 0.8$, and m=11.7. Accordingly, the NiHf-doped $Co_2Y$-type ferrite can be stoichiometric or non-stoichiometric, e.g., in an aspect m is 12 and in an aspect m is not equal to 12. The NiHf-doped $Co_2Y$-type ferrite can have a formula of $Ba_{2.1}Co_{1.6}Cu_{0.4}Ni_{0.2}Hf_{0.2}Fe_{11.3}O_{22}$, $Ba_{2.1}Co_{1.6}Cu_{0.4}Ni_{0.4}Hf_{0.4}Fe_{10.9}O_{22}$, $Ba_{2.1}Co_{1.6}Cu_{0.4}Ni_{0.6}Hf_{0.6}Fe_{10.5}O_{22}$, or $Ba_{2.1}Co_{1.6}Cu_{0.4}Ni_{0.8}Hf_{0.8}Fe_{10.1}O_{22}$.

Without wishing to be bound by any theory, it is believed that the hafnium or titanium can modify the grain boundary of the NiHf- or NiTi-doped $Co_2$Y-type ferrite, as opposed to just the lattice structure, which can provide decreased loss as compared to other 4+ cations such as zirconium or molybdenum. Permeability and loss of a $Co_2$Y-type ferrite can be tailored by inclusion of NiHf or NiTi.

The NiHf- or NiTi-doped $Co_2$Y-type ferrite can have a permeability (μ') of 1.5 to 2.5, for example, 1.51 to 2.48, at a frequency of 0.5 to 3 GHz. The NiHf- or NiTi-doped $Co_2$Y-type ferrite can have a magnetic loss tangent (tan $\delta_\mu=\mu''/\mu'$) of less than or equal to 0.08, for example, 0.02 to 0.08, at a frequency of 0.5 to 3 GHz. The NiHf- or NiTi-doped $Co_2$Y-type ferrite can have a permittivity (ε') of 4.7 to 7.5, for example, 4.74 to 7, at a frequency of 0.5 to 3 GHz. The NiHf- or NiTi-doped $Co_2$Y-type ferrite can have a dielectric loss tangent (tan $\delta_\varepsilon=\varepsilon''/\varepsilon'$) of 0.0006 to 0.006, for example, 0.0006 to 0.0044, at a frequency of 0.5 to 3 GHz.

As used herein, the phrase "at a frequency of" can mean at a single frequency value in that range or over the entire frequency range. For example, the phrase "the permeability can be 1.5 to 2.5 at a frequency of 0.5 to 3 GHz," can mean that the permeability is a single value in the range of 1.5 to 2.5, for example, 2.0, at a single frequency in the range of 0.5 to 3 GHz, for example, at 2.4 GHz; or the permeability can be a value defined by the range of 2 to 10 (e.g., varying in this range with frequency) over the entire frequency range spanning from 0.5 to 3 GHz. The magnetic and dielectric properties of the ferrites can be measured using a coaxial airline by vector network analyzer (VNA) in Nicholson-Ross-Weir (NRW) method over a frequency of 0.1 to 10 GHz.

The NiHf- or NiTi-doped $Co_2$Y-type ferrite can be in the form of particulates (for example, having a spherical or irregular shape) or in the form of platelets, whiskers, flakes, etc. A $D_{50}$ particle size by volume of the particulate NiHf- or NiTi-doped $Co_2$Y-type ferrite can be 0.5 to 50 micrometers (μm), or 0.5 to 20 μm, or 1 to 10 μm, or 0.1 to 1 μm. The NiHf- or NiTi-doped $Co_2$Y-type ferrite can have an average particle size is of 0.5 to 50 μm, or 0.5 to 20 μm, or 1 to 10 μm as measured using scanning electron microscopy. Platelets of the NiHf- or NiTi-doped $Co_2$Y-type ferrite can have an average maximum length of 0.1 to 100 μm and an average thickness of 0.05 to 5 μm. The particle size can be determined using a Horiba LA-910 laser light scattering PSD analyzer, or a comparable instrument, or as determined in accordance with ASTM D4464-15. The NiHf- or NiTi-doped $Co_2$Y-type ferrite can have a porosity of greater than 0 to 50 volume percent (vol %), or 20 to 50 vol %, based on the total volume of the NiHf- or NiTi-doped $Co_2$Y-type ferrite. Magnetic properties, dielectric properties, or a combination thereof, for example, permeability, dielectric constant, magnetic loss, dielectric loss, or a combination thereof, can be tailored by altering porosity.

The NiHf- or NiTi-doped $Co_2$Y-type ferrite can be formed by mixing precursor compounds including Ba, Co, Cu, Ni, Fe, O, and either Hf or Ti to form a magnetic oxide mixture, and calcining the magnetic oxide mixture in an oxygen or air atmosphere to form the NiHf- or NiTi-doped $Co_2$Y-type ferrite. Examples of the oxides can include $BaCO_3$, $Co_3O_4$, $\alpha$-$Fe_2O_3$, NiO, $HfO_2$, and CuO.

The NiHf- or NiTi-doped $Co_2$Y-type ferrite can be calcined. The calcining can occur at a calcining temperature of 800 to 1,300° C., or 800 to 1,280° C., or 1,000 to 1,200° C. The calcining can occur for a calcining time of 0.5 to 20 hours. The ramping rate of the calcining step is not particularly limited and can occur at a ramping and cooling rate of 1 to 5 degrees Celsius per minute. The calcining can occur in air or in an oxygen environment, for example, under a flow of oxygen at a flow rate of 0.1 to 10 liters per minute. The calcining step can be the only heating step used in making the NiHf- or NiTi-doped $Co_2$Y-type ferrite.

After the calcining step, the calcined ferrite can be ground and screened to form coarse particles. The coarse particles can be ground to a $D_{50}$ particle size by volume of 0.1 to 20 μm, or 0.5 to 20 μm, or 1 to 10 μm, or 0.1 to 1 μm.

The NiHf- or NiTi-doped $Co_2$Y-type ferrite can be milled. The milling can occur for a milling time of greater than or equal to 1 to 10 minutes, or 5 to 60 minutes, or 1 minute to 10 hours. The milling can occur at a mixing speed of greater than or equal to 300 revolutions per minute (rpm), or 300 to 1,000 rpm, or less than or equal to 600 rpm, or 400 to 500 rpm. The milling can occur in a wet-planetary ball mill. The milled mixture can optionally be screened, for example, using a 10 to 300# sieve. The milled mixture can be mixed with a polymer such as poly(vinyl alcohol) to form granules. The granules can have an average $D_{50}$ particle size by volume of 50 to 300 μm. The milled mixture can be shaped or formed, for example, by compressing at a pressure of 0.2 to 2 megatons per square centimeter. The milled mixture, either particulate or formed, can be heated at a temperature of 50 to 500° C., 200 to 1,280° C., or 100 to 250° C. The milled mixture, either particulate or formed, can be post-annealed at an annealing temperature of 900 to 1,275° C., or 1,200 to 1,250° C. The heating or annealing can occur for 1 to 20 hours, or 4 to 6 hours, or 5 to 12 hours. The annealing can occur in air or oxygen.

For example, reducing particle size of the calcined blend can be performed by any suitable method. Examples of methods to reduce particle size include crushing, grinding, milling, mechanical milling, and a combination thereof. Examples of devices to reduce particle size include a media mill, ball mill, two-roll mill, three-roll mill, bead mill, air-jet mill, and a cryogenic grinder. After reducing the particle size, the particles can be subjected to a sizing procedure, such as sieving, to alter the particle size distribution.

Granulating a mixture of the ferrite particles and a binder can be performed by any suitable method, for example by a spray-drying granulation method or an oscillating extrusion granulating method. For example, a slurry of the ferrite particles, binder, and various additives as desired can be dispersed in a solvent, such as water, and then the slurry can be spray-dried with, for example, a spray dryer to produce granules. In an embodiment, ferrite particles, a binder, and various additives as required can be mixed and granulated with a stirring granulator to produce a granulated powder. The granulated powder can then be extruded and granulated with an oscillating granulator to produce granules.

The binder is selected to be removable from the green body by heating and optionally for solubility in a solvent. Examples of a binder include polyvinylpyrrolidone, poly (vinyl alcohol), polyvinyl butyral, polyacrylamide, poly (acrylic acid), polyethylene glycol, polyethylene oxide, cellulose acetate, starch, polypropylene carbonate, polyvinyl acetate, and a combination thereof. In an embodiment, the binder is polyvinyl alcohol, polyvinyl butyral, or a combination thereof.

In an embodiment, granules can be formed from a mixture including ferrite particles and 0.5-5 weight percent of polyvinyl alcohol, based on a total weight of the mixture. The granules can have a size of particle size of, for example, 50 to 300 μm.

The granulated ferrite composition is molded into a predetermined shape by, for example, injection molding, calendaring lamination, extrusion molding, or a compression molding method such as a single pressing method, a double pressing method, a floating die method, or a withdrawal method, to obtain a green body. The compression machine is appropriately selected depending on the selected size, shape, and quantity of green bodies, such as a mechanical press, a hydraulic press, or a servo press. The molding pressure for forming the green body can be 0.3 to 3 metric tons per square centimeter ($MT/cm^2$), or 0.5 to 2 $MT/cm^2$.

The green body can then be sintered in a suitable atmosphere to form the ferrite composition. The sintering can occur at a sintering temperature of 800 to 1,300° C. 900 to 1,250° C., or 1,000 to 1,200° C. The sintering can occur for a sintering time of 1 to 20 hours, or 2.55 to 12 hours. The atmosphere can be air, nitrogen, oxygen, or a combination thereof. The sintering can be performed with a heating rate of 1 to 5° C. per minute, a cooling rate of 1 to 5° C. per minute, or a combination thereof.

For application of the ferrite particles in a polymer-based composite, the NiHf- or NiTi-doped $Co_2Y$-type ferrite can include a surface coating. The coating can allow for an increased amount of the NiHf- or NiTi-doped $Co_2Y$-type ferrite in a composite. The coating can be a hydrophobic coating. The coating can include a silane coating, a titanate coating, a zirconate coating, or a combination thereof.

The silane coating can be formed from a silane, which can include a linear silane, a branched silane, a cyclosilane, or a combination thereof. The silane can include a precipitated silane. The silane can be free of a solvent (such as toluene) or a dispersed silane, for example, the silane can include 0 to 2 weight percent (wt %) (for example, 0 wt %) of a solvent dispersed silane, based on the total weight of the silane.

A variety of different silanes can be used to form the coating, for example, a phenylsilane, a fluorosilane, or a combination thereof. The phenylsilane can be p-chloromethyl phenyl trimethoxy silane, phenyl trimethoxy silane, phenyl triethoxy silane, phenyl trichlorosilane, phenyl-tris-(4-biphenylyl) silane, hexaphenyldisilane, tetrakis-4-biphenylyl)silane, tetra-Z-thienylsilane, phenyltri-Z-thienylsilane, 3-pyridyltriphenylsilane, or a combination therof. Functionalized phenylsilanes can also be used, for example, functional phenylsilanes of the formula $R'SiZ^1R^2Z^2$ wherein R' is alkyl with 1 to 3 carbon atoms, —SH, —CN, —$N_3$ or hydrogen; $Z^1$ and $Z^2$ are each independently chlorine, fluorine, bromine, alkoxy with not more than 6 carbon atoms, NH, —$NH_2$, —$NR_2'$; and $R^2$ is

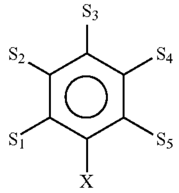

wherein each of the S-substituents, $S_1$, $S_2$, $S_3$, $S_4$ and $S_5$ are independently hydrogen, alkyl with 1 to 4 carbon atoms, methoxy, ethoxy, or cyano, provided that a, e.g., at least one, S-substituent is not hydrogen, and when there is a methyl or methoxy S-substituent, then (i) at least two of the S-substituents are other than hydrogen, (ii) two adjacent S-substituents form with the phenyl nucleus a naphthalene or anthracene group, or (iii) three adjacent S-substituents form together with the phenyl nucleus a pyrene group, and X is the group —$(CH_2)_n$—, wherein n is 0 to 20, for example, 10 to 16 when n is not 0, in other words X is an optional spacer group, the S-substituents. The term "lower" in connection with groups or compounds, means 1 to 7, or 1 to 4 carbon atoms.

The fluorosilane coating can be formed from a perfluorinated alkyl silane having the formula: $CF_3(CF_2)_n$—$CH_2CH_2SiX$, wherein X is a hydrolyzable functional group and n=0 or a whole integer. The fluorosilane can include (3,3,3-trifluoropropyl)trichlorosilane, (3,3,3-trifluoropropyl)dimethylchlorosilane, (3,3,3-trifluoropropyl)methyldichlorosilane, (3,3,3-trifluoropropyl)methyldimethoxysilane, (tridecafluoro-1,1,2,2-tetrahydrooctyl)-1-trichlorosilane, (tridecafluoro-1,1,2,2-tetrahydrooctyl)-1-methyldichlorosilane, (tridecafluoro-1,1,2,2-tetrahydrooctyl)-1-dimethylchlorosilane, (heptadecafluoro-1,1,2,2-tetrahydrodecyl)-1-methyldichlorosilane, (heptadecafluoro-1,1,2,2-tetrahydrodecyl)-1-trichlorosilane, heptadecafluoro-1,1,2,2-tetrahydrodecyl)-1-dimethylchlorosilane, (heptafluoroisopropoxy) propylmethyldichlorosilane, 3-(heptafluoroisopropoxy) propyltrichlorosilane, 3-(heptafluoroisopropoxy) propyltriethoxysilane, perfluorooctyltriethoxysilane, or a combination thereof.

Other silanes can be used instead of, or in addition to, the phenylsilane or the fluorosilane, for example, aminosilanes and silanes containing polymerizable functional groups such as acryl and methacryl groups. Examples of aminosilanes include N-methyl-γ-aminopropyltriethoxysilane, N-ethyl-γ-aminopropyltrimethoxysilane, N-methyl-β-aminoethyltrimethoxysilane, γ-aminopropylmethyldimethoxysilane, N-methyl-γ-aminopropylmethyldimethoxysilane, N-(β-N-methylaminoethyl)-γ-aminopropyltriethoxysilane, N-(γ-aminopropyl)-γ-aminopropylmethyldimethoxysilane, N-(γ-aminopropyl)-N-methyl-γ-aminopropylmethyldimethoxysilane and γ-aminopropylethyldiethoxysilaneaminoethylamino trimethoxy silane, aminoethylamino propyl trimethoxy silane, 2-ethylpiperidinotrimethylsilane, 2-ethylpiperidinomethylphenylchlorosilane, 2-ethylpiperidinodimethylhydridosilane, 2-ethylpiperidinodicyclopentylchlorosilane, (2-ethylpiperidino) (5-hexenyl)methylchlorosilane, morpholinovinylmethylchlorosilane, n-methylpiperazinophenyldichlorosilane, or a combination thereof.

Silanes including a polymerizable functional group include silanes of the formula $R^a_xSiR^b_{(3-x)}R$, in which each $R^a$ is the same or different (for example, the same) and is halogen (for example, Cl or Br), $C_{1-4}$ alkoxy (for example, methoxy or ethoxy), or $C_{2-6}$ acyl; each $R^b$ is a $C_{1-8}$ alkyl or $C_{6-12}$ aryl (for example, $R^b$ can be methyl, ethyl, propyl, butyl or phenyl); x is 1, 2 or 3 (for example, 2 or 3); and R is —$(CH_2)_nOC(═O)C(R^c)═CH_2$, wherein $R^c$ is hydrogen or methyl and n is an integer 1 to 6, or, 2 to 4. The silane can include methacrylsilane (3-methacryloxypropyl trimethoxy silane), trimethooxyphenylsilane, or a combination thereof.

The titanate coating can be formed from neopentyl(diallyl)oxy, trincodecanonyl titanate; neopentyl(diallyl)oxy, tri (dodecyl)benzene-sulfonyl titanate; neopentyl(diallyl)oxy, tri(dioctyl)phosphato titanate; neopentyl(diallyl)oxy, tri(dioctyl)pyro-phosphato titanate; neopentyl(diallyl)oxy, tri(N-ethylenediamino) ethyl titanate; neopentyl(diallyl)oxy, tri (m-amino)phenyl titanate; and neopentyl(diallyl)oxy, trihydroxy caproyl titanate; or a combination thereof. The zirconate coating can be formed from neopentyl(diallyloxy)

tri(dioctyl) pyro-phosphate zirconate, neopentyl(diallyoxy) tri(N-ethylenediamino) ethyl zirconate, or a combination thereof.

The NiHf- or NiTi-doped $Co_2Y$-type ferrite can be coated to a level of less than or equal to 10 wt %, or less than or equal to 5 wt %, or 0.1 to 5 wt %, or 0.1 to 3 wt %, based on the total weight of the NiHf- or NiTi-doped $Co_2Y$-type ferrite plus the coating.

The NiHf- or NiTi-doped $Co_2Y$-type ferrite can be a bulk ceramic or can be present in a composite, for example, comprising NiHf- or NiTi-doped $Co_2Y$-type ferrite particles and a polymer. The polymer can include a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride, polyvinylidene fluoride, fluorinated ethylene-propylene (FEP), polytetrafluoroethylene (PTFE), poly(ethylene-tetrafluoroethylene, or perfluoroalkoxy (PFA)), polyacetals (for example, polyoxyethylene or polyoxymethylene), poly ($C_{1-6}$ alkyl)acrylates, polyacrylamides (including unsubstituted and mono-N- or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones or polyether ketone ketones), polyarylene ketones, polyarylene sulfides (for example, polyphenylene sulfides), polyarylene sulfones (for example, polyethersulfones (PES) or polyphenylene sulfones), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl) methacrylates, polyalkylacrylamides (for example, unsubstituted and mono-N- or di-N—($C_{1-8}$ alkyl)acrylamides), polyolefins (for example, polyethylenes, such as high density polyethylene, low density polyethylene, or linear low density polyethylene, polypropylenes, or their halogenated derivatives (such as PTFE), or their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene or methyl methacrylate-butadiene-styrene), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or a combination thereof. The thermoplastic polymer can be chosen based on characteristics thereof such as temperature stability and low dielectric loss.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include, for example, alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers or copolymers thereof, e.g., poly(butadiene-isoprene)), polyisocyanates, polyureas, polyurethanes, triallyl cyanurate polymers, triallyl isocyanurate polymers, certain silicones, or polymerizable prepolymers (e.g., prepolymers having ethylenic unsaturation, such as unsaturated polyesters, polyimides). The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl)methacrylate, acrylonitrile, vinyl acetate, allyl acetate, triallyl cyanurate, triallyl isocyanurate, or acrylamide.

The polymer can include a paraffin wax, a PTFE, a polyethylene, a polypropylene, polyolefin, a polyurethane, a silicone polymer, a liquid crystalline polymer, poly(ether ether ketone), poly(phenylene sulfide), or a combination thereof. The polymer can include a fluoropolymer (for example, a PTFE). The polymer can include a poly(phenylene sulfide).

If the polymer includes PTFE, powders of the PTFE and the NiHf- or NiTi-doped $Co_2Y$-type ferrite can be blended together and then air milled. A commercially available example of an air mill is the Jet Pulverizer MICRON-MASTER mill. The air milled powders can allow for higher filler loadings without the article becoming brittle. Other energy intensive methods, such a blending in a Patterson Kelly vee-blender with an intensifier bar, can be used. The intensively mixed powders can then be compression molded.

The PTFE composite can be prepared by dispersion casting. Dispersion casting can allow for the production of PTFE composites filled to higher than 60 vol % that still retain excellent flexibility. The films can be cast and then sintered on a carrier sheet to result in a free film or cast onto glass fabric to form a fabric reinforced composite sheet. The composite sheets can be used "as cast" as a dielectric load or stacked to a desired final thickness and densified in a press. The casting mixture can be made by dispersing the particles in water and combining the slurry with PTFE dispersion and stabilizing additives, and increasing the viscosity to keep the particles from settling.

The PTFE composite can be prepared by paste extrusion and calendering to result in flexible particulate-filled PTFE composites with filler contents in excess of 60 vol %. The ferrite filler can be dispersed in water, mixed with a PTFE dispersion and then co-coagulated with the PTFE to form a "dough." The dough can then be lubricated with a hydrocarbon liquid and extruded into a ribbon that can then calendered into sheets. Alternatively, the filler and PTFE "fine powder" (also known as "coagulated dispersion" PTFE) can be mixed and lubricated in a vee-blender, and then paste extruded and calendered. The lubricant can be removed and the sheets can be stacked to the desired basis weight and laminated in a flat bed press.

The NiHf- or NiTi-doped $Co_2Y$-type ferrite composite can include 5 to 95 vol %, or 50 to 80 vol %, or 40 to 60 vol % of the NiHf- or NiTi-doped $Co_2Y$-type ferrite, based on the total volume of the NiHf- or NiTi-doped $Co_2Y$-type ferrite composite. The NiHf- or NiTi-doped $Co_2Y$-type ferrite composite can include or 20 to 80 vol %, for example, 30 to 80 vol % or 30 to 50 vol %, of the polymer, based on the total volume of the NiHf- or NiTi-doped $Co_2Y$-type ferrite composite. The NiHf- or NiTi-doped $Co_2Y$-typeferrite composite can be formed, for example, by compression molding, injection molding, reaction injection molding, laminating, extruding, calendering, casting, or rolling.

The composite can have a porosity. The porosity of the composite can be 1 to 60 vol %, or 1 to 30 vol %, based on the total volume of the composite. Without intending to be bound by theory, it is believed that porosity of the composite can help lower the permittivity of the composite relative to the permeability. The porosity can be tuned by altering one or more of the calcining temperature or the particle size of the ferrite. In an aspect, the composite can be free of a void space.

The composite can include additional additives, such as dielectric fillers or flame retardants, so long as the additive are less than 5 vol. % of the total volume of the composite.

A particulate dielectric filler can be employed to adjust the dielectric constant, dissipation factor, coefficient of thermal expansion, and other properties of the composite. Exemplary dielectric fillers include titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talc, nanoclay, magnesium hydroxide, or a combination thereof.

Flame retardants can be halogenated or unhalogenated. An exemplary inorganic flame retardant is a metal hydrate such as a hydrate of a metal such as Mg, Ca, Al, Fe, Zn, Ba, Cu, Ni, or a combination thereof. In an embodiment, the hydrates can include aluminum hydroxide, magnesium hydroxide, calcium hydroxide, iron hydroxide, zinc hydroxide, copper hydroxide, or nickel hydroxide; or a hydrate of calcium aluminate, gypsum dihydrate, zinc borate, or barium metaborate. Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, or halogenated compounds such as hexachloroendomethylenetetrahydrophthalic acid (HET acid), tetrabromophthalic acid, or dibromoneopentyl glycol, for example.

An article can include the NiHf- or NiTi-doped $Co_2Y$-type ferrite. The article can be an antenna, for example, for GPS tracking. The article can be used for a variety of devices operable within the ultrahigh frequency range, such as a high frequency or microwave antenna, filter, inductor, circulator, or phase shifter. The article can be an antenna (for example, a patch antenna), a filter, an inductor, a circulator, or an EMI (electromagnetic interference) suppressor. Such articles can be used in commercial and military applications, weather radar, scientific communications, wireless communications, autonomous vehicles, aircraft communications, space communications, satellite communications, or surveillance.

The article can include a dielectric layer that includes the composite; and a conductive layer. Useful conductive layers include, for example, stainless steel, copper, gold, silver, aluminum, zinc, tin, lead, a transition metal, or an alloy including at least one of the foregoing. There are no particular limitations regarding the thickness of the conductive layer, nor are there any limitations as to the shape, size, or texture of the surface of the conductive layer. The conductive layer can have a thickness of 3 to 200 μm, or 9 to 180 μm. When two or more conductive layers are present, the thickness of the two layers can be the same or different. The conductive layer can include a copper layer. Suitable conductive layers include a thin layer of a conductive metal such as a copper foil presently used in the formation of circuits, for example, electrodeposited copper foils. The copper foil can have a root mean squared roughness of less than or equal to 2 μm, for example, less than or equal to 0.7 μm, wherein roughness is measured using a Veeco Instruments WYCO Optical Profiler, using the method of white light interferometry.

The conductive layer can be applied by placing the conductive layer in the mold prior to molding the composite, by laminating conductive layer onto the composite (also referred to herein as the substrate), by direct laser structuring, or by adhering the conductive layer to the substrate via an adhesive layer. Other methods can be used to apply the conductive layer where permitted by the particular materials and form of the circuit material, for example, electrodeposition or chemical vapor deposition.

The laminating can entail laminating a multilayer stack including the substrate, a conductive layer, and an optional intermediate layer between the substrate and the conductive layer to form a layered structure. The conductive layer can be in direct contact with the substrate layer, without the intermediate layer. The layered structure can then be placed in a press, e.g., a vacuum press, under a pressure and temperature and for duration of time suitable to bond the layers and form a laminate. Lamination and optional curing can be by a one-step process, for example, using a vacuum press, or can be by a multi-step process. In a one-step process, the layered structure can be placed in a press, brought up to laminating pressure (e.g., 150 to 400 pounds per square inch (1 to 2.8 megapascals) and heated to laminating temperature (e.g., 260 to 390° C.). The laminating temperature and pressure can be maintained for a desired soak time, i.e., 20 minutes, and thereafter cooled (while still under pressure) to less than or equal to 150° C.

If present, the intermediate layer can include a polyfluorocarbon film that can be located in between the conductive layer and the substrate layer, and an optional layer of microglass reinforced fluorocarbon polymer can be located in between the polyfluorocarbon film and the conductive layer. The layer of microglass reinforced fluorocarbon polymer can increase the adhesion of the conductive layer to the substrate. The microglass can be present in an amount of 4 to 30 wt %, based on the total weight of the layer. The microglass can have a longest length scale of less than or equal to 900 μm, or less than or equal to 500 μm. The microglass can be microglass of the type as commercially available by Johns-Manville Corporation of Denver, Colorado. The polyfluorocarbon film includes a fluoropolymer (such as PTFE, a fluorinated ethylene-propylene copolymer, or a copolymer having a tetrafluoroethylene backbone with a fully fluorinated alkoxy side chain).

The conductive layer can be applied by laser direct structuring. The substrate can include a laser direct structuring additive; and the laser direct structuring can include using a laser to irradiate the surface of the substrate, forming a track of the laser direct structuring additive, and applying a conductive metal to the track. The laser direct structuring additive can include a metal oxide particle (such as titanium oxide and copper chromium oxide). The laser direct structuring additive can include a spinel-based inorganic metal oxide particle, such as spinel copper. The metal oxide particle can be coated, for example, with a composition including tin and antimony (for example, 50 to 99 wt % of tin and 1 to 50 wt % of antimony, based on the total weight of the coating). The laser direct structuring additive can include 2 to 20 parts of the additive, based on 100 parts of the respective composition. The irradiating can be performed with a yttrium aluminum garnet (YAG) laser having a wavelength of 1,064 nanometers under an output power of 10 Watts, a frequency of 80 kilohertz, and a rate of 3 meters per second. The conductive metal can be applied using a plating process in an electroless plating bath including, for example, copper.

The conductive layer can be applied by adhesively applying the conductive layer. The conductive layer can be a circuit (the metallized layer of another circuit), for example, a flex circuit. An adhesion layer can be disposed between one or more conductive layers and the substrate. An exemplary adhesion layer can include at least one of a poly (arylene ether); or a polybutadiene, a polyisoprene, or a poly(butadiene-isoprene), each further comprising 0 to 50 wt % of co-curable monomer units. The adhesive layer can be present in an amount of 2 to 15 grams per square meter. The poly(arylene ether) can be a carboxy-functionalized poly(arylene ether), for example a reaction product of a poly(arylene ether) and a cyclic anhydride, maleic anhydride, or a combination thereof. Similarly, the polybutadiene, polyisoprene, or poly(butadiene-isoprene), each further comprising 0 to 50 wt % of co-curable monomer units can be carboxylated, for example by reaction with a cyclic anhydride or maleic anhydride.

The NiHf- or NiTi-doped $Co_2Y$-typeferrite can be used in antenna applications (for example, a global navigation satellite system (GNSS) of 1.2 to 1.6 GHz or Wi-Fi of 2.4 or 5 GHz) and inductors. A polymer-based composite including the ferrite can be operated over a frequency band of 2 to 10 GHz for various applications such as an antenna or inductor.

The following examples are provided to illustrate the present disclosure. The examples are merely illustrative and are not intended to limit devices made in accordance with the disclosure to the materials, conditions, or process parameters set forth therein.

EXAMPLES

The magnetic permeability and the magnetic loss of the ferrites were measured in the coaxial airline by vector network analyzer (VNA) in Nicholson-Ross-Weir (NRW) method over a frequency of 0.1 to 10 gigahertz (GHz).

The NiHf- or NiTi-doped $Co_2Y$-type ferrite formulations of the examples are listed in Table 1.

TABLE 1

Formulas of hexaferrite $Ba_{2.1}Co_{1.6}Cu_{0.4}Ni_x(Hf, Ti)_xFe_{(11.7-2x)}O_{22}$

| Example | x | Formulation |
|---|---|---|
| 1 | 0 | $Ba_{2.1}Co_{1.6}Cu_{0.4}Fe_{11.7}O_{22}$ |
| 2 | 0.2 | $Ba_{2.1}Co_{1.6}Cu_{0.4}Ni_{0.2}Hf_{0.2}Fe_{11.3}O_{22}$ |
| 3 | 0.4 | $Ba_{2.1}Co_{1.6}Cu_{0.4}Ni_{0.4}Hf_{0.4}Fe_{10.9}O_{22}$ |
| 4 | 0.6 | $Ba_{2.1}Co_{1.6}Cu_{0.4}Ni_{0.6}Hf_{0.6}Fe_{10.5}O_{22}$ |
| 5 | 0.8 | $Ba_{2.1}Co_{1.6}Cu_{0.4}Ni_{0.8}Hf_{0.8}Fe_{10.1}O_{22}$ |
| 6 | 0.2 | $Ba_{2.1}Co_{1.6}Cu_{0.4}Ni_{0.2}Ti_{0.2}Fe_{11.3}O_{22}$ |

The NiHf-doped $Co_2Y$-type ferrites were prepared by mixing $\alpha$-$Fe_2O$, $BaCO_3$, $HfO_2$, NiO, CuO, $Co_3O_4$ in amounts to form the ferrites of Examples 1 to 5 and the NiTi-doped $Co_2Y$-type ferrite was prepared by mixing $\alpha$-$Fe_2O$, $BaCO_3$, $TiO_2$, NiO, CuO, $Co_3O_4$ in amounts to form the ferrites of Example 6. The oxide mixtures were mixed in a wet-plenary ball mill for two hours at 350 revolutions per minute (rpm) and calcined at a temperature of 1,100° C. for a soak time of 4 hours in air. The calcined ferrite material was crushed using a Jaw Crusher machine and screened through a 40# sieve to form coarse particles. The coarse particles were ground in stainless steel jars for 3 minutes in planetary ball mill at 350 rpm to provide ferrite particles having a $D_{50}$ particle size by volume of 0.5 to 10 micrometers (μm). Polyvinyl alcohol (PVA) was mixed with the with ferrite particles in an amount of 0.5-5 weight percent of PVA, based on a total amount of the ferrite particles and the PVA, and granules were formed by passing the formed composite through a 40# sieve. The granules were compressed into a ferrite green body under a pressure of 1 megatons per square centimeter, with a toroid having an outer diameter of 7 millimeters (mm), an inner diameter of 3 mm, a thickness of 3 to 3.5 mm for permeability and permittivity measurement, and a disk having a diameter of 6 mm for magnetic hysteresis measurement. The green body was sintered at 1,100° C. for 4 hours in air, at a ramp rate of 3 degrees Celsius per minute (° C./min) and a cool rate of 3° C./min.

Figure 2:
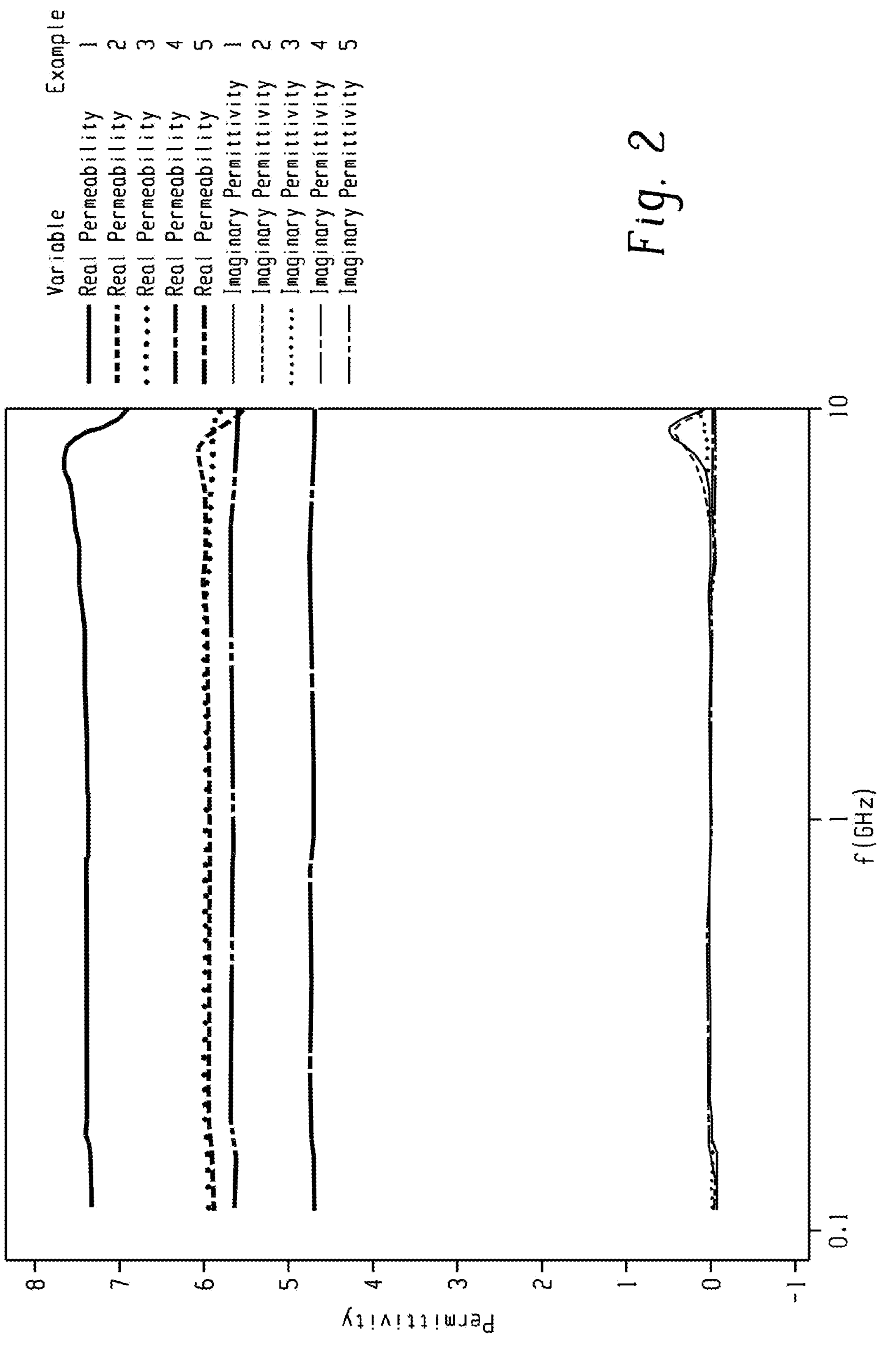
FIG. 2 is a graph of real permittivity ε' and imaginary permittivity ε" versus frequency (f) (GHz) showing dielectric spectra of the NiHf-doped $Co_2Y$-type ferrite ceramics of Examples 1 to 5.

FIG. 1 is a graph of real permeability μ' and imaginary permeability μ" versus frequency (f) (gigahertz (GHz)) for Examples 1 to 5. FIG. 2 is a graph of real permittivity ε' and imaginary permittivity ε" versus frequency (GHz) for Examples 1 to 5. With reference to FIG. 1, the permeability decreases with increased nickel content, and the magnetic loss decreases. And with reference to FIG. 2, the dielectric constant (permittivity) decreases with increased nickel content.

Tables 2-4 provide real permeability, magnetic loss tangent, permittivity, and dielectric loss tangent of each of the Table 1 ferrite compositions at various frequencies. Example 1 exhibited a desirable combination of high real permeability and low magnetic loss tangent at 1 GHz (2.4 and 0.06, respectively); Example 2 exhibited a desirable combination of high real permeability and low magnetic loss tangent at 1.6 GHz (1.80 and 0.04, respectively) and 2 GHz (1.81 and 0.05, respectively); and Example 3 exhibited a desirable combination of high real permeability and low magnetic loss tangent at 1 GHz (1.60 and 0.02, respectively), 1.6 GHz (1.64 and 0.03, respectively), 2.4 GHz (1.65 and 0.05, respectively), and 3 GHz (1.67 and 0.08, respectively). A desirable combination of high real permeability and low magnetic loss tangent can be, for example, greater than or equal to 1.50 and less than or equal to 0.08, respectively (see Example 2 at 1 GHz; Example 2 at 1.6 or 2 GHz; and Example 3 at 1, 1.6, 2.4, or 3 GHz). Dielectric constant (permittivity (ε')) for Examples 1 to 5 was 4.7 to 7.5 over a frequency band of 0.5 to 3 GHz, and the dielectric loss tangent (ε"/ε') was 0.0006 to 0.006 over a frequency band of 0.5 to 3 GHz (with the exception of Examples 1, 4, and 5 at 1 GHz; and Example 8 at 3 GHz). Example 6, which included Ti, exhibited permeability and loss tangent similar to Example 2, which included Hf, over a frequency from 0.5 to 3 GHz.

TABLE 2

| Example | Porosity (%) | 0.5 GHz μ' | 0.5 GHz μ"/μ' | 0.5 GHz ε' | 0.5 GHz ε"/ε' | 1 GHz μ' | 1 GHz μ"/μ' | 1 GHz ε' | 1 GHz ε"/ε' |
|---|---|---|---|---|---|---|---|---|---|
| 1 | 27.6 | 2.44 | 0.03 | 7.44 | 0.0033 | 2.4 | 0.06 | 6.96 | 0.0006 |
| 2 | 39.2 | 1.78 | 0.03 | 5.99 | 0.0023 | 1.79 | 0.03 | 5.92 | 0.0040 |
| 3 | 39.3 | | | | | 1.60 | 0.02 | 5.33 | 0.0021 |
| 4 | 36.7 | | | | | 1.60 | 0.03 | 4.74 | 0.0012 |
| 5 | 38.4 | | | | | 1.51 | 0.03 | 5.23 | 0.0009 |
| 6 | 36.2 | 1.91 | 0.03 | 5.35 | 0.0035 | 1.91 | 0.04 | 5.34 | 0.0018 |

TABLE 3

| Example | Porosity (%) | 1.6 GHz μ' | 1.6 GHz μ"/μ' | 1.6 GHz ε' | 1.6 GHz ε"/ε' | 2 GHz μ' | 2 GHz μ"/μ' | 2 GHz ε' | 2 GHz ε"/ε' |
|---|---|---|---|---|---|---|---|---|---|
| 1 | 27.6 | 2.45 | 0.09 | 6.97 | 0.0025 | 2.45 | 0.11 | 6.99 | 0.0031 |
| 2 | 39.2 | 1.80 | 0.04 | 5.94 | 0.0034 | 1.81 | 0.05 | 5.95 | 0.0035 |
| 3 | 39.3 | 1.64 | 0.03 | 5.35 | 0.0025 | 1.65 | 0.04 | 5.36 | 0.0025 |
| 4 | 36.7 | 1.62 | 0.03 | 4.75 | 0.0033 | 1.63 | 0.04 | 4.76 | 0.0039 |
| 5 | 38.4 | 1.53 | 0.03 | 5.23 | 0.0030 | 1.53 | 0.04 | 5.24 | 0.0041 |
| 6 | 6.2 | | | | | 1.92 | 0.07 | 5.36 | 0.004 |

TABLE 4

| Example | Porosity (%) | 2.4 GHz μ' | 2.4 GHz μ"/μ' | 2.4 GHz ε' | 2.4 GHz ε"/ε' | 3 GHz μ' | 3 GHz μ"/μ' | 3 GHz ε' | 3 GHz ε"/ε' |
|---|---|---|---|---|---|---|---|---|---|
| 1 | 27.6 | 2.46 | 0.15 | 7.00 | 0.0018 | 2.48 | 0.20 | 7.00 | 0.0018 |
| 2 | 39.2 | 1.81 | 0.06 | 5.96 | 0.0044 | 1.84 | 0.09 | 5.97 | 0.0042 |
| 3 | 39.3 | 1.65 | 0.05 | 5.36 | 0.0031 | 1.67 | 0.08 | 5.36 | 0.0013 |
| 4 | 36.7 | 1.64 | 0.06 | 4.76 | 0.0018 | 1.67 | 0.10 | 4.76 | 0.0017 |
| 5 | 38.4 | 1.54 | 0.06 | 5.24 | 0.0025 | 1.56 | 0.08 | 5.25 | 0.0024 |
| 6 | 36.2 | 1.92 | 0.10 | 5.37 | 0.0020 | | | | |

Set forth below are non-limiting aspects of the present disclosure.

Aspect 1. A NiHf- or NiTi-doped $Co_2Y$-type ferrite, having a formula of $$Ba_{n-x}Sr_xCo_{2-y}Cu_yNi_zHf_zFe_{(m-2z)}O_{22} \text{ or } Ba_{n-x}Sr_xCo_{2-y}Cu_yNi_zTi_zFe_{(m-2z)}O_{22}$$

wherein $2 \le n \le 2.4$, $0 \le x \le 1$, $0.1 \le y \le 1$, $0 < z \le 2$, and $10 \le m \le 13$.

Aspect 2. The NiHf-doped $Co_2Y$-type ferrite of aspect 1, having the formula of $$Ba_{n-x}Sr_xCo_{2-y}Cu_yNi_zHf_zFe_{(m-2z)}O_{22}.$$

Aspect 3. The doped NiHf- or NiTi-doped $Co_2Y$-type of aspect 1 or 2, wherein x=0, and $0.1 \le z \le 2$.

Aspect 4. The NiHf- or NiTi-doped $Co_2Y$-type of aspect 3, wherein n=2.1, y=0.4, $0.2 \le z \le 0.8$, and m=11.7.

Aspect 5. The NiHf- or NiTi-doped $Co_2Y$-type ferrite of any of the preceding aspects, having a magnetic permeability (μ') of 1.5 to 2.5 at a frequency of 0.5 to 3 GHz; a magnetic loss tangent (tan $\delta_\mu$) of 0.02 to 0.08 at a frequency of 0.5 to 3 GHz; a permittivity (ε') of 4.7 to 7.5 at a frequency of 0.5 to 3 GHz; a dielectric loss tangent (tan $\delta_\varepsilon$) of 0.0006 to 0.006 at a frequency of 0.5 to 3 GHz; or a combination of the foregoing.

Aspect 6. The NiHf- or NiTi-doped $Co_2Y$-type ferrite of any of the preceding aspects, having a magnetic permeability (μ') of 1.5 to 2.5 at a frequency of 0.5 to 3 GHz; a magnetic loss tangent (tan $\delta_\mu$) of 0.02 to 0.08 at a frequency of 0.5 to 3 GHz; a permittivity (ε') of 4.7 to 7.5 at a frequency of 0.5 to 3 GHz; and a dielectric loss tangent (tan $\delta_\varepsilon$) of 0.0006 to 0.006 at a frequency of 0.5 to 3 GHz.

Aspect 7. The NiHf- or NiTi-doped $Co_2Y$-type ferrite of any of the preceding aspects, having a porosity of 20 to 50 volume percent, based on a total volume of the NiHf- or NiTi-doped $Co_2Y$-type ferrite.

Aspect 8. A composite comprising: a polymer; and the NiHf- or NiTi-doped $Co_2Y$-type ferrite of any of the preceding aspects.

Aspect 9. The composite of aspect 8, wherein the polymer comprises a polytetrafluoroethylene, a polyethylene, a polypropylene, polyolefin, a polyurethane, a silicone polymer, a liquid crystalline polymer, a poly(ether ether ketone), a poly(phenylene sulfide), or a combination thereof.

Aspect 10. The composite of aspect 9, wherein the polymer comprises a polytetrafluoroethylene or a poly(phenylene sulfide).

Aspect 11. An article comprising the NiHf- or NiTi-doped $Co_2Y$-type ferrite of any of aspects 1 to 6 or the composite of any of aspects 8 to 10.

Aspect 12. The article of aspect 11, wherein the article is an antenna.

Aspect 13. A method of making a NiHf- or NiTi-doped $Co_2Y$-type ferrite comprising: milling ferrite precursor compounds comprising oxides of Ba, Co, Cu, Ni, Fe, and either Hf or Ti to form a magnetic oxide mixture; and calcining the magnetic oxide mixture in an oxygen or air atmosphere to form the NiHf- or NiTi-doped $Co_2Y$-type ferrite.

Aspect 14. The method of aspect 12, wherein the NiHf- or NiTi-doped $Co_2Y$-type ferrite has a formula of $$Ba_{n-x}Sr_xCo_{2-y}Cu_yNi_zHf_zFe_{(m-2z)}O_{22} \text{ or } Ba_{n-x}Sr_xCo_{2-y}Cu_yNi_zTi_zFe_{(m-2z)}O_{22}$$

wherein $2 \le n \le 2.4$, $0 \le x \le 1$, $0.1 \le y \le 1$, $0 < z \le 2$, and $10 \le m \le 13$.

Aspect 15. The method of aspect 14, wherein the NiHf-doped $Co_2Y$-type ferrite has the formula of $$Ba_{n-x}Sr_xCo_{2-y}Cu_yNi_zHf_2Fe_{(m-2z)}O_{22}.$$

Aspect 16. The method of any of aspects 13 to 15, further comprising: reducing particle size of the magnetic oxide mixture following calcination to obtain particles; granulating a mixture of the particles and a binder to obtain granules; compressing granules into a green body; and sintering the green body to form the NiHf- or NiTi-doped $Co_2Y$-type ferrite.

Aspect 17. The method of any of aspects 13 to 16, further comprising forming a composite comprising the NiHf- or NiTi-doped $Co_2Y$-type ferrite and a polymer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect." means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A NiHf-doped $Co_2Y$-type ferrite, having a formula of $$Ba_{n-x}Sr_xCo_{2-y}Cu_yNi_zHf_zFe_{(m-2z)}O_{22}$$

wherein
- $2 \le n \le 2.4$,
- $0 \le x \le 1$,
- $0.1 \le y \le 1$,
- $0 < z \le 2$, and
- $10 \le m \le 13$.

2. The NiHf-doped $Co_2Y$-type ferrite of claim 1, wherein $x=0$, and $0.1 \le z \le 2$.

3. The NiHf-doped $Co_2Y$-type ferrite of claim 2, wherein $n=2.1$, $y=0.4$, $0.2 \le z \le 0.8$, and $m=11.7$.

4. The NiHf-doped $Co_2Y$-type ferrite of claim 1, having
- a magnetic permeability ($\mu'$) of 1.5 to 2.5 at a frequency of 0.5 to 3 GHz;
- a magnetic loss tangent ($\tan \delta_\mu$) of 0.02 to 0.08 at a frequency of 0.5 to 3 GHZ;
- a permittivity ($\varepsilon'$) of 4.7 to 7.5 at a frequency of 0.5 to 3 GHZ;
- a dielectric loss tangent ($\tan \delta_\varepsilon$) of 0.0006 to 0.006 at a frequency of 0.5 to 3 GHz; or
- a combination of the foregoing.

5. The NiHf-doped $Co_2Y$-type ferrite of claim 1, having
- a magnetic permeability ($\mu'$) of 1.5 to 2.5 at a frequency of 0.5 to 3 GHz;
- a magnetic loss tangent ($\tan \delta_\mu$) of 0.02 to 0.08 at a frequency of 0.5 to 3 GHz;
- a permittivity ($\varepsilon'$) of 4.7 to 7.5 at a frequency of 0.5 to 3 GHz; and
- a dielectric loss tangent ($\tan \delta_\varepsilon$) of 0.0006 to 0.006 at a frequency of 0.5 to 3 GHz.

6. The NiHf-doped $Co_2Y$-type ferrite of claim 1, having a porosity of 20 to 50 volume percent, based on a total volume of the NiHf-doped $Co_2Y$-type ferrite.

7. A composite comprising:
- a polymer; and
- the NiHf-doped or $Co_2Y$-type ferrite of claim 1.

8. The composite of claim 7, wherein the polymer comprises a polytetrafluoroethylene, a polyethylene, a polypropylene, polyolefin, a polyurethane, a silicone polymer, a liquid crystalline polymer, a poly(ether ether ketone), a poly(phenylene sulfide), or a combination thereof.

9. The composite of claim 8, wherein the polymer comprises a polytetrafluoroethylene or a poly(phenylene sulfide) .

10. An article comprising the NiHf-doped $Co_2Y$-type ferrite of claim 1.

11. The article of claim 10, wherein the article is an antenna.

12. A method of making the NiHf-doped $Co_2Y$-type ferrite of claim 1, the method comprising:

milling ferrite precursor compounds comprising oxides of Ba, Co, Cu, Ni, Fe, and Hf to form a magnetic oxide mixture; and calcining the magnetic oxide mixture in an oxygen or air atmosphere to form the NiHf-doped $Co_2Y$-type ferrite.

13. The method of claim 12, further comprising:

reducing particle size of the magnetic oxide mixture following calcination to obtain particles;

granulating a mixture of the particles and a binder to obtain granules;

compressing granules into a green body; and sintering the green body to form the NiHf-doped $Co_2Y$-type ferrite.

14. The method of claim 12, further comprising forming a composite comprising the NiHf-doped $Co_2Y$-type ferrite and a polymer.

* * * * *